(No Model.)
A. D. LEWIS.
PISTON ROD PACKING.
No. 421,944. Patented Feb. 25, 1890.
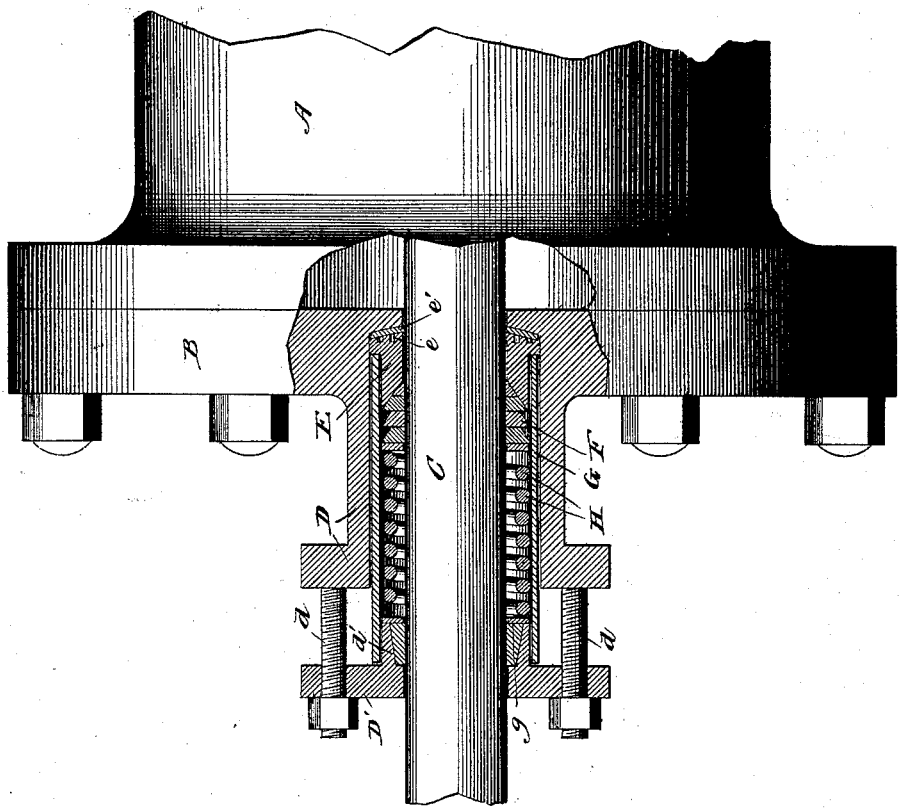
Witnesses,
F. Mann
J. W. Millington
Inventor,
Albert D. Lewis
By C. C. Linthicum
Atty

UNITED STATES PATENT OFFICE.

ALBERT D. LEWIS, OF CHICAGO, ILLINOIS, ASSIGNOR, BY DIRECT AND MESNE ASSIGNMENTS, TO THE LEWIS METALLIC PACKING COMPANY.

PISTON-ROD PACKING.

SPECIFICATION forming part of Letters Patent No. 421,944, dated February 25, 1890.

Application filed September 14, 1888. Serial No. 285,363. (No model.)

*To all whom it may concern:*

Be it known that I, ALBERT D. LEWIS, of Chicago, Illinois, have invented certain new and useful Improvements in Piston-Rod Packing, of which the following is a specification.

My invention relates to that class of piston-packing wherein split or divided metallic packing-rings are preferably employed, which rings encircle the piston-rod and are seated at one end in a cone-shaped chamber and at the other against a spring, whereby as they wear the spring, forcing them into the chamber at all times, tightly packs the rod.

My invention relates to a piston-rod packing which comprises, in addition to the gland and stuffing-box, a gasket placed in the bottom of the stuffing-box, a metallic ring seated on the gasket and having a peripheral ledge or flange, on which is seated one end of a tubular shell or casing, and a concave seat on its upper and inner side to receive packing-rings, packing-rings held to their seat by a spring, and the gland being adapted to bear upon the outer end of the spring in order to confine it against the packing-ring and also against the top of the tubular shell or casing, whereby the gasket at the bottom of the stuffing-box is compressed and forms a steam-tight joint at the bottom of the stuffing-box.

In the accompanying drawing the figure is a side elevation, partly in section, of a cylinder-head, stuffing-box, and piston-rod with my improved packing applied thereto.

In the drawing, A represents the cylinder; B, the cylinder-head; C, the piston-rod, and D the stuffing-box, having a gland D' and the studs d d, all of usual construction. I prefer to make the bottom of the stuffing-box concave in the usual form and to fit therein an asbestus gasket e'. Seated thereon is a metal ring E, whose lower face is convex to conform to the asbestus packing in the bottom of the stuffing-box and is provided with annular grooves e, into which the material of the gasket will be forced, and thereby form a steam joint. The upper end of said ring E is turned off on its outer circumference to provide a peripheral ledge or seat to receive the casing, and the inner edge thereof is beveled to provide a conical seat for the metallic rings F.

G is the casing, which is of such length as to project through the stuffing-box and beyond the end thereof a sufficient distance to contain the spring, the packing, and the flange of the gland. This shell or casing is preferably made tight, so as to contain a lubricant.

H is the spring, which has a bearing at its inner end either directly or indirectly upon the packing-rings F, and at its outer end it is confined by the gland D', whose flange d' projects into the casing and bears upon the washer g, against which the upper end of the spring is seated. If preferred, the ring E and the casing G may be formed integrally.

The asbestus gasket in the bottom of the stuffing-box forms a steam-tight joint, whereby the passage of steam to the stuffing-box is avoided. The casing has a firm bearing upon the metal ring E at the one end and in the stuffing-box throughout the body. The spring is sufficiently strong to efficiently pack the rod and retain the packing-rings in proper alignment therewith without undue friction and the subsequent loss by the wear. The feature of providing a convenient receptacle for a lubricant which is admitted directly to the rod, spring, and packing is very desirable. This device is adapted for use with the original and common form of stuffing-box, and can be readily applied to engines without the necessity of change.

I claim—

1. In a piston-rod packing, the combination, with the gland and stuffing-box, of a gasket surrounding the rod and resting upon the bottom of the stuffing-box, a metallic ring seated on the gasket and having on the interior of its upper end a conical seat for packing-rings, packing-rings surrounding the rod and seated on the ring, a spring adapted to bear upon the rings, and a shell or casing surrounding the rings and spring and bearing with the ring upon the gasket, substantially as described.

2. In a piston-rod packing, the combination, with the gland and stuffing-box, of a shell or casing adapted to enter the stuffing-box, a gasket surrounding the rod and resting upon the bottom of the stuffing-box, a metallic ring adapted to bear upon said gasket at the bottom of the stuffing-box and having on its upper end a concave seat to receive packing-rings and a peripheral ledge or flange to form a seat for the inner end of the casing, packing-rings adapted to the seat, and a spring adapted to bear upon said rings, substantially as described.

ALBERT D. LEWIS.

Witnesses:
C. C. LINTHICUM,
T. D. BUTLER.